United States Patent [19]
Blomgren et al.

[11] 3,974,753
[45] Aug. 17, 1976

[54] AUTOMOBILE ROOF VENT

[75] Inventors: David Carl Blomgren, Menlo Park; Robert D. Sanchez, Burlingame, both of Calif.

[73] Assignees: Lois Loreen Sanchez; Robert Daniel Sanchez, both of San Mateo; David Carl Blomgren, Menlo Park, all of Calif. ; part interest to each

[22] Filed: Mar. 10, 1975

[21] Appl. No.: 556,735

[52] U.S. Cl. ............................. 98/2.14; 296/137 R; 296/137 E; 296/137 B; 49/397; 220/335
[51] Int. Cl.² .......................................... B60H 1/26
[58] Field of Search ........ 296/137 H, 137 B, 137 G, 296/137 F, 137 R; 98/2.12–2.15; 49/397, 394, 383; 220/335

[56] References Cited
UNITED STATES PATENTS

| | | | |
|---|---|---|---|
| 2,173,890 | 9/1936 | Tuttle | 296/137 |
| 2,215,022 | 9/1940 | Votypka | 296/137 E |
| 2,372,164 | 3/1945 | Woodhams | 98/2.14 |
| 3,093,258 | 6/1963 | Turner | 220/335 |
| 3,319,996 | 5/1967 | Calthrope | 296/137 R |
| 3,331,161 | 7/1967 | Ruff | 49/397 |

*Primary Examiner*—John J. Camby
*Assistant Examiner*—Henry C. Yuen
*Attorney, Agent, or Firm*—Fulwider, Patton, Rieber, Lee & Utecht

[57] ABSTRACT

There is disclosed a removable vent window for a roof of an automobile which is particularly adapted for retrofit installation. The vent window is mounted in an opening extending across a major width of a car roof, preferably slightly rearwardly of the forward edge of the roof. The opening is framed with members of preformed or stretch formed extruded aluminum which are stretch formed into a generally rectangular frame to provide support for the hinges and latches that secure the vent window. The vent window is removably mounted in the opening by hinge members along the forward edge of the opening. The rear edge of the opening and window bear detachable latching mechanisms whereby the window can be pivoted between a closed, sealing position and an open, forwardly inclined, venting position. The latch mechanisms can be detached from the window, freeing the rear edge of the window and permitting it to be pivoted to an elevated position and disengaged from its hinges for complete removal of the window. The window is installed in existing roof panels by cutting the panel to the approximate dimensions of the desired opening, placing the preformed frame members into the opening and applying a bonding adhesive between the frame members and the panel surrounding the opening. The vent window is shaped with a surface contour that approximates the contour of the roof and the panel is mounted in the frame members and latched into its closed position so that the frame members and surrounding roof are clamped into the desired roof contour by the rigid window panel. The assembly is retained in this clamped configuration until the bonding adhesive has cured sufficiently that the frame members support the surrounding roof panel.

16 Claims, 15 Drawing Figures

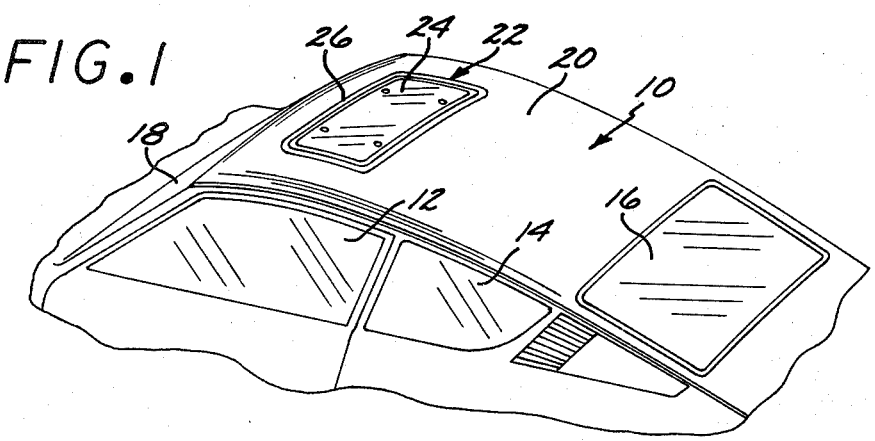
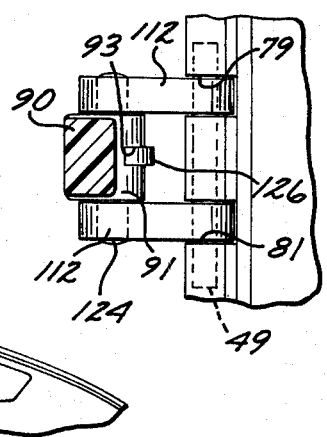
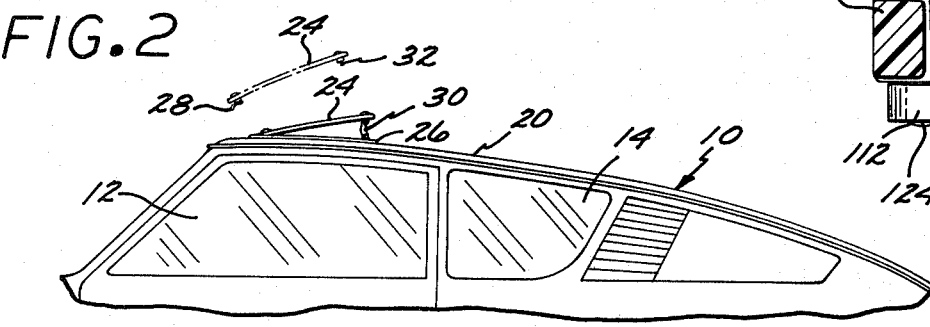
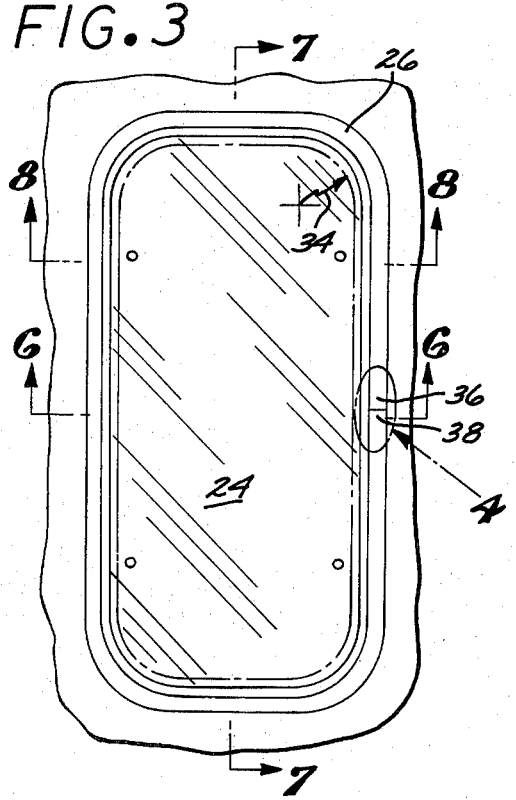
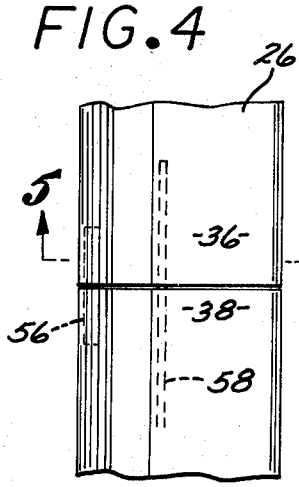
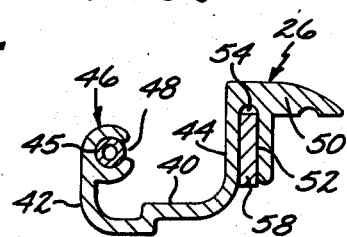
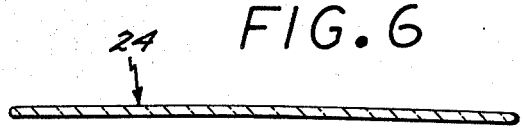
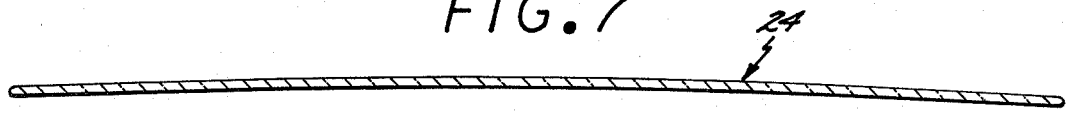

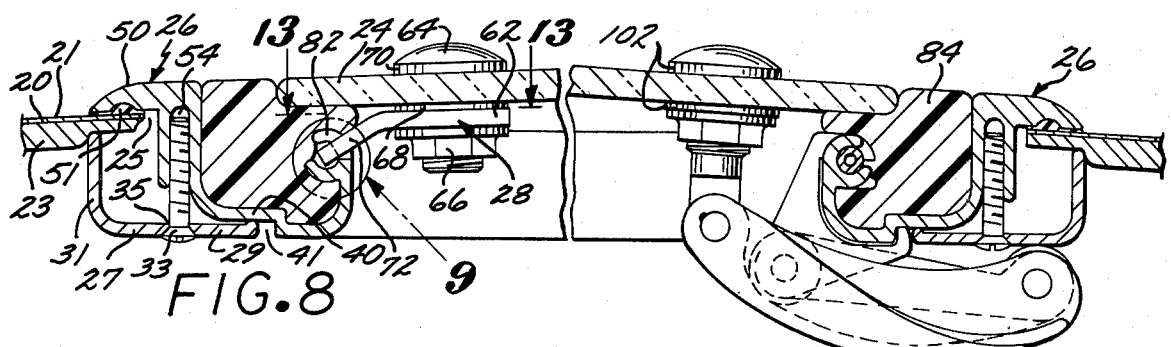
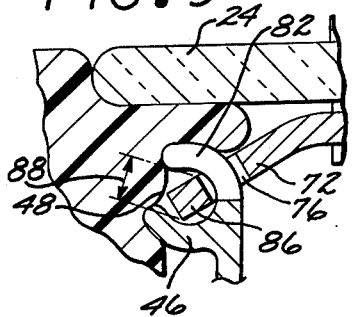
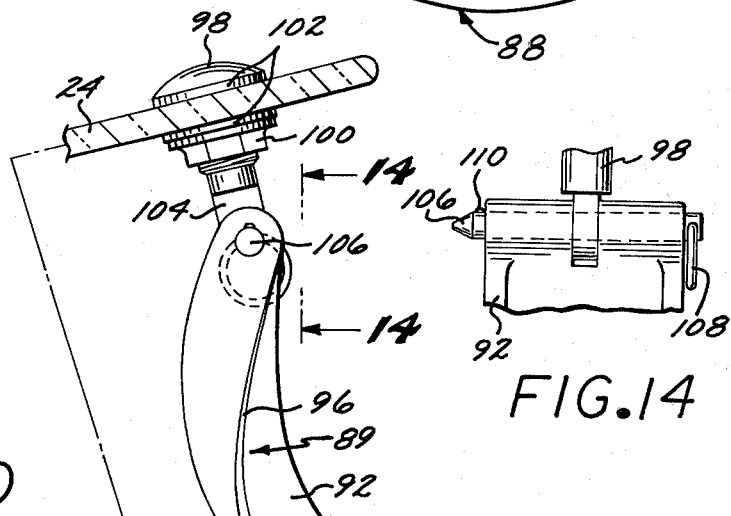
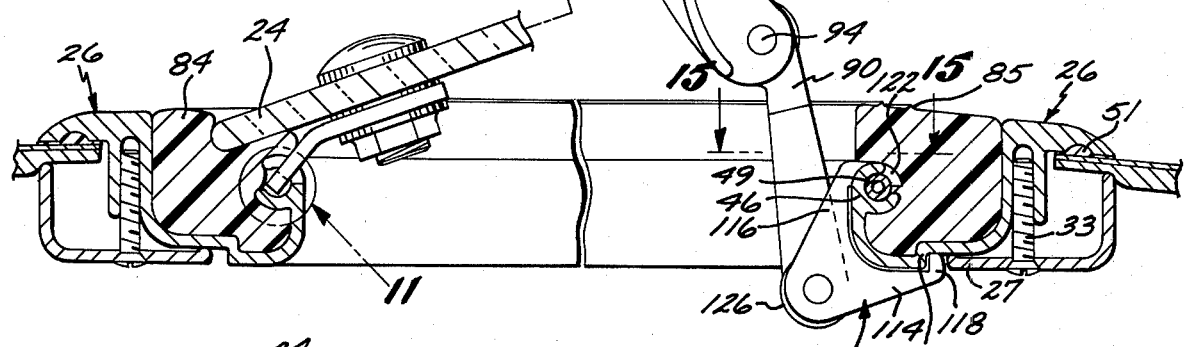
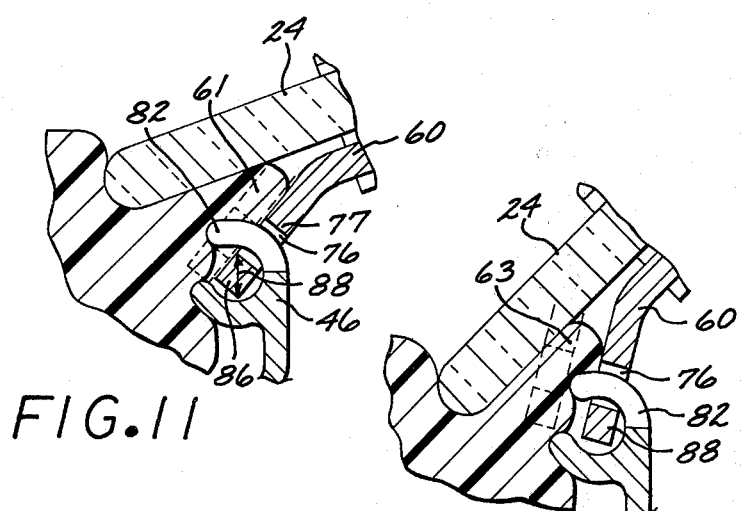
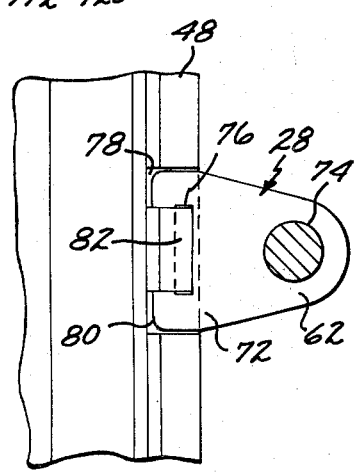

3,974,753

AUTOMOBILE ROOF VENT

BACKGROUND OF THE INVENTION

1. Field of the Invention

This invention relates to an automobile vent and, in particular, relates to a roof vent and supporting framework which are particularly suited for retrofit installation.

2. Description of the Prior Art

A popular option in European automobiles has been the sun roof which is generally formed as a fabric closure in an opening of a roof panel of the car. Recently, a similar option has been made available on new American cars which is formed as a sliding, rigid metal or glass panel that is mounted in the roof of the automobile and is provided with a power assist for opening and closing the opening. This option is quite expensive and has an elaborate construction requiring installation of reinforcement members to carry the bulk and weight of the mechanism.

A common disadvantage of most sun roof installations is that the sliding or closure panel of the sun roof does not baffle the occupants from the wind which is turbently introduced into the car through the open sun roof at highway speeds.

Most automobiles also lack adequate ventilation and do not provide sufficient flow of outside air through the car to insure the comfort of the occupants. It is, therefore, necessary to open the car windows and endure the noise and force of the wind through the windows or operate the energy consuming air conditioner on cars equipped with air conditioners. It is, therefore, desirable to provide additional ventilation provisions in an automobile and, desirably, combine such ventilation provision in a removable roof vent installation, thereby securing the desired ventilation with the pleasing advantages of a sun roof. Desirably, such an installation should be designed for retrofitting of existing cars as well as for use on original equipment.

BRIEF STATEMENT OF THE INVENTION

This invention comprises a vent for a roof of an automobile and a method for its installation. The vent closure panel is mounted in the roof panel for pivotal movement between closed and venting positions and is removably carried on the roof panel. In its preferred embodiment, the closure panel is transparent and formed of glass, rigid plastic and the like. The vent closure panel is mounted in an opening in the roof panel of a car using frame members, which, preferably, are aluminum extrusions. The frame members comprise upper and lower members which are stretch formed into generally rectangular frames and clamped together about the roof panel surrounding the opening. The upper frame member is of a general, upwardly facing channel construction with a web and outboard and inboard sides. The inboard side supports, along its top edge, a dependent channel having an arcuate cross section and a longitudinal slot opening into the main channel of this frame member. The outboard side portion of the main channel bears, at its top edge, an outwardly dependent flange for overlying the surrounding roof structure. The lower frame member is of a general ring shape with an angle cross section having one side adapted to be engaged against the undersurface of the web of the main channel of the upper frame member and its opposite side to bear against the surrounding roof portion which underlies the peripheral flange of the upper frame member. Fastening means such as screws and the like are placed between the two frame members, securing their assembly to the roof panel.

The vent closure panel which, preferably, is transparent and of glass construction, is removably secured in the opening, with its forward edge pivotally engaged by hinge means attached to the upper frame member. Latch means are provided at the rear edges of the removable vent panel and upper frame member to lock the closure panel in a closed position, sealably engaged against seal means carried in the main channel of the upper frame member.

The closure panel of the assembly is removably carried on the upper frame member of the assembly by hinge means having an interlock which prevents the disassembly of the mating members of the hinge means when the latch means are attached to the opposite side of the closure panel, thereby providing a safety interlock which prevents accidental dislodgement of the closure panel.

The invention also comprises a method for the installation of the aforedescribed closure panel and frame assembly in an opening through a roof of an automobile. In this method, the opening is established in the roof at the desired location and the preformed upper and lower frame members are placed in the opening. A suitable bonding adhesive sealant such as a silicon resin is placed between the roof and the undersurface of the peripheral flange carried by the outboard side member of the channel upper frame member. The lower frame member is placed in the assembly and secured therein by suitable screw fasteners and the like. Before the adhesive sealant is cured into a firm set condition, the closure panel is placed in its closed position and locked by the latching means, thereby clamping the frame assembly and surrounding roof panel to the contour of the rigid closure panel. Preferably, this closure panel has a surface contour which conforms to the unrelieved surface contour of the roof panel so that, upon completion of the installation, the roof panel is secured in a contour substantially identical to that prior to the installation of the assembly.

BRIEF DESCRIPTION OF THE DRAWINGS

The invention will be described with reference to the preferred embodiment which is illustrated in the figures, of which:

FIG. 1 illustrates the roof vent of the invention in a roof panel of a car;

FIG. 2 illustrates the closure panel of the roof vent in its vent position;

FIG. 3 is a plan view of the closure panel and frame structure of the invention;

FIG. 4 is an enlarged detail view of the frame member joint assembly;

FIG. 5 is a sectional elevation view along line 5—5 of FIG. 4;

FIGS. 6 and 7 are end and side views, respectively, of the closure panel used in the invention;

FIG. 8 is a sectional side elevation view of the roof vent with the closure panel in its closed position;

FIG. 9 is a detail view of portion 9 identified in FIG. 8;

FIG. 10 is a sectional side elevation view of the roof vent with the closure panel in its venting position;

FIG. 11 is a detailed view of the hinge structure as shown in FIG. 10;

FIG. 12 illustrates the position of the hinge members that permits removal of the closure panel;

FIG. 13 is a view along line 13—13 of FIG. 8;

FIG. 14 is a view along line 14—14 of FIG. 10; and

FIG. 15 is a view along line 15—15 of FIG. 10.

DESCRIPTION OF PREFERRED EMBODIMENTS

Referring now to FIG. 1, there is illustrated an automobile 10 of conventional construction having side windows 12 and 14, a rear window 16, a windshield 18 and a roof 20. The roof vent of the invention is generally indicated at 22 and comprises a closure panel 24 that preferably is of transparent material such as glass, e.g., tempered glass, safety glass, etc., or of a transparent plastic such as a polycarbonate or polyacrylate material. If desired, closure panel 24 could, of course, be formed of an opaque material such as metal, fiberglass and the like or could be formed of translucent glass or plastics. When formed of transparent materials it is preferred that the material contain a tint or pigment to reduce the glare and transmission of ultra-violet rays.

The closure panel 24 is mounted over an opening established in the roof panel which, preferably, extends a substantial width of the roof panel 20 and, most preferably, is positioned closely behind the windshield 18 so that closure panel 24 is over the front seat of the vehicle. The closure panel is suspended in the opening of roof 20 by frame members such as upper frame member 26 which is coextensive with and which entirely surrounds the opening in the roof panel.

As previously mentioned, the closure panel is removably attached to the vent frame assembly by hinge means permitting its pivotal movement between closed and venting positions. FIG. 2 illustrates the closure panel 24 in its venting position with a forward inclination. The forward edge of panel 24 is engaged by hinge means carried on the forward edge of the frame member 26 including a hinge member 28 that is mounted on the forward edge of panel 24; see the closure panel 24 in its removed position. The closure panel 24 also bears detachable latch means in the form of latch 30 which are secured by attachment means to eyelets 32 carried at the rear of closure panel 24.

The upper frame member 26 is shown as a preformed frame member which, desirably, is an extruded metal shape, typically formed of aluminum. The extruded metal shape is stretch formed about radii 34 at each corner to form a generally rectangular shape and is placed in the opening of roof panel 20 with its ends 36 and 38 joined in a butt joint that is illustrated in greater detail in FIGS. 4 and 5.

Referring to FIG. 5, the upper frame member 26 is shown as an extruded metal form with a generally upwardly open channel having a web 40 and opposite and parallel sides 42 and 44. The inboard side 42 carries an outwardly facing arcuate channel 46 along its upper edge which has an open, coextensive slot 48. The opposite side, 44, carries a peripheral, flat flange 50 dependent from its upper edge. Preferably, flange 50 supports a rib 52 which is coextensive with and parallel to side 44 of the main channel of upper frame member 26 to provide an elongated slot 54 of a generally rectangular cross section.

The arcuate slot 45 of the channel 46 and the rectangular elongated slot 54 provide recesses for insertion of suitable fastening means which will secure the butt joint between the opposed ends 36 and 38 of the upper frame member 26. These fastening means are shown in FIGS. 4 and 5 as spiral pin 56 which is secured in arcuate slot 45 and bar 58 that is secured in rectangular slot 54, bridging the butt joint between ends 36 and 38. These members are placed into the butt joint and the surrounding metal is upset to lock the fastening means securely in place, thereby securing the upper frame in its shaped assembly shown in FIG. 3.

The closure panel 24 is preferably shaped with a contour which closely conforms to the contour of roof panel 20. This panel has a slightly domed contour with its upper surface generally convex and having a side elevation cross section as shown in FIG. 6 and an end elevation cross section as shown in FIG. 7. It has been found that the formation of this closure panel 24 with the illustrated dome shape will conform the panel to the contour of a substantial majority of existing cars, e.g., from 75 to about 90% of present day cars. If desired, of course, closure panel 24 could be custom contoured to the exact shape of the particular car model to be fitted with the roof vent of the invention.

As illustrated in FIG. 8, the roof 20 is formed of conventional sheet metal 21 and has an interior head liner 23 of fabric, plastic and the like. The roof is cut to establish opening 25 therein to accommodate the roof vent of the invention. The frame assembly, which is coextensive with the opening 25, includes the upper frame member 26, previously described, and a lower clamping ring, frame member 27, which has an angle cross section. The upper frame member 26 is placed in the opening with its peripheral flange portion 50 overlying the surrounding metal of roof 20 and is cemented thereto by suitable bonding adhesive sealant generally indicated at 51. Web 40 of the main channel of upper frame member 26 preferably is off set with a recessed portion 41 on its undersurface that forms an abutment for engagement by the upper surface of the side 29 of lower frame member 27. The upright side 31 of this frame member 27 bears against the undersurface of roof 20, compressing the head liner 23 as illustrated. The lower frame member 27 and upper frame member 26 are thus clamped together about the peripheral portion of roof 20 surrounding opening 25 by suitable fastening means such as self tapping screws 33 which are placed through spaced apertures 35 in the lower frame member 27 and which engage rectangular slot 54 of the upper frame member 26. The recessed portion 41 of web 40 receives side 29 of the lower frame member 27 so that the undersurface of this frame member is generally coplanar with the remainder of the web 40 of the upper frame member 26, providing a flush fitting assembly.

The forward edge of panel 24 bears suitable hinge members which cooperate with hinge members carried by the upper frame member 26. A suitable hinge member is illustrated by the hinge plate 28 which has a flat portion 62 that is secured against closure panel 24 by bolt fastener 64, flanged nut 66 and washers 68 and 70. Washers 68 and 70 are of plastics, e.g. Nylon and washer 68 preferably is a shouldered washer with its shoulder projecting into the bore through panel 24, thereby protecting and isolating glass panel 24 from metal contact. The forward portion 72 of hinge plate 28 is bent downwardly at a slight inclination, e.g., about 25 to 40 degrees, preferably about 25 to about 35 degrees, to provide an offset portion for engagement by the cooperative hinge member carried by the upper frame member 26 of the roof vent assembly. FIG. 13 illustrates the hinge plate 28 in greater detail where it can be seen that this member has an aperture 74 in its flat portion 62 to receive the shank of bolt 64 and a generally elongated, rectangular slot 76 in its forward portion 72. The arcuate channel 48 has two parallel, transverse grooves 78 and 80 which are spaced apart by a slight distance to form an arcuate tongue 82 therebetween. This tongue 82 extends through slot 76 of hinge plate 28 while grooves 78 and 80 provide clearance for the unslotted portions of plate 28, thereby permitting the tongue 82 to be placed into slot 76, completing the assembly of the hinge at the leading edge of the closure panel 24. A plurality of these hinge means can be provided at spaced positions along the length of the forward edge of closure panel 24; the illustrated embodiment shows two such hinge assemblies, one each positioned at either side of the closure panel. In the assembly, nut 66 is torqued to permit hinge plate 28 to rotate about bolt 64 to the necessary degree experienced when the panel 24 is pivoted about its hinged attachment to frame 26. This freedom of rotation of plates 28 is necessary since frame 26 is bowed outwardly and the pivot centers of these hinges are not coaxial.

The main channel of the upper frame member 26 bears seal means in the form of resilient, flexible seal 84 formed of rubber, polyurethane, and the like. The seal 84 is molded or extended into a shape having a contour fitting into the main channel of upper frame member 26 and can bear one or more ribs 85 along its upper surface (see FIG. 10) to form a sealing seat for closure panel 24.

The hinge assemblies of the roof vent have interlock means which prevent the accidental dislodgement of hinge plates 28 from their mating hinge members, tongues 82. The interlock means are effective through all positions of the closure panel 24 between its closed and full open, vent position. The interlock means however, are releasable when the closure panel 24 is detached from its latch mechanism and pivoted past its fully open, vent position.

The interlock means of the hinge means are illustrated in FIG. 9 with the closure panel 24 in its closed position as shown in FIG. 8. The slot 76 in the portion 72 of hinge plate 28 is positioned a sufficient distance from the forward edge of plate 28 to provide an unrelieved web 86 that has a diagonal thickness 88 which is greater than the width of the slot 48 of arcuate channel 46. When closure panel 24 is in the closed position as illustrated in FIG. 9, the unrelieved web 86 is oriented in the arcuate channel with its diagonal thickness preventing the escape of hinge plate 28 from tongue 82 and the latch mechanism is thereby interlocked to prevent accidental dislodgement of the closure panel 24.

Referring now to FIG. 10, the closure panel is illustrated in its full open, vent position. In this position, the latch mechanism 89 at the rear of the closure panel 24 is in its fully extended position. This latch mechanism, which can be of conventional construction, comprises a folding clasp with a toggle member 90 and a surrounding channel member 92 which are joined in an articulated joint by pin 94. The channel member 92 can be of molded plastic or metal with an attractive surface finish and can have handle means such as rib 96 for gripping of the member and operation of the latch mechanism. One end of the latch mechanism is detachably secured to the closure panel 42 by attachment means which include an eyelet member such as bolt 98 which is carried on the closure panel 24 by nut 100 and washers 102. The bolt 98 has flats 104 cut on its opposite sides for fitting into the end of channel member 92. The flatted shank portion of bolt 98 is bored to receive pin 106 whereby the channel member 92 is pivotally engaged to bolt 98.

FIG. 14 illustrates the detachable means of this interconnection between bolt 98 and channel member 92. Pin 106 bears pull ring 108 on its outboard end to permit one to grasp the pin and retrieve it from the assembly. The pin 106 is retained in the assembly by suitable detent means such as ball 110 that is carried on the inboard end of pin 106 and is spring biased by means, internal of pin 106, to urge ball 110 outwardly.

The remainder of each latch mechanism comprises support brackets 112 which are secured to the inboard side of the main channel of the upper frame member 26. Bracket 112 is bifrucated with legs 114 and 116 that bear suitable means to attach to frame member 26 such as lip 118 on leg 114 which engages into a groove between shoulder 120 in the web 40 of the main channel of upper frame member 26 and the edge of lower frame member 27. Arcuate channel 46 bears transverse slots such as 78 and 80 previously described with regard to the hinge assemblies. These slots provide relieved portions in arcuate channel 46 for receiving hook extensions 122 carried by legs 116 of brackets 112. This construction is also illustrated in FIG. 15 where toggle member 90 of the latch mechanism is shown pivotally supported by a pair of brackets 112 which carry pin 124. The toggle member 90 has a base 91 which fits between brackets 112 and is bored to receive pin 124 that provides pivotal support for toggle 90. The base 91 is slotted at 93 to receive a rubber washer 126 of sufficient diameter to extend outside of base 91 and provide a cushion bearing that prevents rattling of the latch in its folded position. A similar rubber washer is provided in the pivot joint at the opposite end of toggle 90; see FIG. 10. The pivot brackets 112 are secured to the arcuate channel 46 in transverse slots 79 and 81 by pin 49 which is placed in arcuate channel 46 and is secured therein by upsetting or crimping the surrounding metal to secure the pin against dislodgement.

As previously mentioned, the hinge means of the invention bears interlock means to prevent dislodgement of the hinge plates 28 from tongues 82 in all closed and venting positions of panel 24. FIG. 11 illustrates the hinge means with the closure panel 24 extended to its fully opened, vent position. This position is at a forward inclination of from 20 to about 45 degrees, preferably from about 25 to about 30 degrees. At this inclination, the diagonals 88 of the unrelieved webs 86 of plates 28 block the release of hinge plates 28 from the tongues 82 of the arcuate channel 46 as illustrated in FIG. 11. Even, however, if the tolerances in the manufacture of the hinge plates and arcuate channels are such that this diagonal lacks the necessary dimension to block release of plate 28 from arcuate channel 46, slots 76 are sufficiently narrow so that these slots do not clear the top edge of tongues 82. This is illustrated by the position 61 shown in broken lines for the hinge plate 28. In this position it can be seen that the shoulder 77 at the lower inboard corner of slot 76 fails to clear tongue 82 and thereby prevents the plate 28 from sliding over tongue 82 to release the panel 24.

The interlocks of the hinge means are rendered ineffective by removal of pins 106 to detach latch mechanisms 88 from bolts 98 and rotation of the closure panel 24 past its full open, vent position, e.g., raising of closure panel 24 to a forward inclination of about 60° or greater. This movement and release of the hinge members is shown in FIG. 12 with the closure member 24 tilted to a sharply inclined angle, greater than about 45°. This rotates hinge plates 28 in the arcuate channel 46 so that their unrelieved portions 88 are positioned with their width, rather than diagonal, exposed to the open slot of channel 46. In this position, the webs 88 can be freed from engagement in the arcuate channel and the slot 76 is of sufficient width to clear arcuate tongue 82, permitting release and movement of the closure panel 24 to the position shown by the broken lines 63. The closure panel 24 is thereby freed for removal from the vehicle. The panel 24 can be stored in the vehicle while the occupants enjoy all the advantages of an open sun roof.

The invention as thus described provides a roof vent for a vehicle that can be fitted with a transparent closure member, permitting the occupants' an unrestricted view through the closure member. The closure member is also pivotal between a fully closed, sealing position against resilient seal ring 84 and any of a plurality of venting positions wherein its rearward edge is raised above the opening. In this position, the forwardly inclined closure panel 24 serves as a wind baffle, preventing turbulent introduction of wind into the vehicle during its movement. The flow of air over the extended panel, however, creates a low pressure at the rear of the panel that is effective in expelling air from the vehicle and insuring good circulation of air throughout the vehicle.

The closure panel can also be removed from the vehicle to provide an open sun roof simply by pulling pins 106 from the latch mechanisms and pivoting the closure panel 24 into a sharply inclined position which permits separation of the hinge plates from their restraining tongues.

The roof vent is installed in a car roof by forming opening 25 therein. The assembly of the upper frame member 26, roof panel, hinges and latches 26 is placed into the opening with a suitable adhesive sealant 51 positioned along the undersurface of flange 50 of frame member 26 to provide a seal between the roof and this frame member. The trim ring, or lower frame member 27, of the assembly is placed about the opening and secured in place by screw fasteners 33.

Forming of the frame member 26 into a complete frame with joined, butted ends is, preferably performed at the factory where spiral pin 48 and bar 58 are placed in their respective grooves. Similarly, closure panel 24 is pre-assembled to frame member 26 at the factory where hinge plates 28 are placed in the arcuate channels, engaged by tongues 82 of the hinge means. The latch mechanisms 89 are secured by placement of pins 106 and the latch mechanisms are closed to clamp together the assembly of closure panel 24 and upper and lower frame members 26 and 27.

Since closure panel 24 is a rigid, load-bearing panel, clamping of the closure member 24 in the assembly secures the frame members in the contour of the slightly domed closure panel and insures that the roof panel 20 does not sag about the opening under the weight of the roof vent assembly. The closure panel 24 is retained in its closed position until the bonding adhesive sealant 51 cures into a firm set condition, generally for a period of about 15 minutes to several hours. The open framework is thus bonded to the roof 20 to retain the contour of the roof when the closure panel 24 is opened or removed from the assembly.

The invention has been described with reference to the presently preferred and illustrated embodiments thereof. It is not intended that the invention be unduly limited by this disclosure of preferred embodiments. Instead, it is intended that this invention be defined by the means and their obvious equivalents set forth in the following claims.

What is claimed is:

1. In an automobile body having a fixed, rigid roof over the passenger compartment, the improvement comprising:
   an opening extending across a major width of said roof and positioned slightly rearwardly of the forward edge of said roof;
   frame means carried by said roof about the periphery of said opening;
   a vent closure panel having substantially the same shape and dimensions as said opening;
   a frame member having an upright main channel with a cross section having a web and parallel sides coextensive with the edge of said opening;
   an inwardly dependent channel having an arcuate cross section carried on the upper edge of the inboard side of the main channel of said frame member;
   a first pair of side-by-side grooves extending transversely across said dependent channel on one side of said frame member to provide an arcuate tongue there between; and
   a hinge plate mounted to said panel and bearing a slot along one edge thereof receiving said arcuate tongue to permit pivotal movement of said closure panel between a closed position over said opening and a forwardly inclined, open, vent position;
   closure panel seal means carried by said frame; and
   latch means secured at the rear edge of said closure panel and carried on the rear edge of said frame for locking said closure panel in said closed position against said seal means and for supporting said closure panel in said vent position.

2. The improvement of claim 1 wherein said latch means permits pivotal movement of said panel through a secured arc of from 0° to about 40°.

3. The improvement of claim 1 wherein said latch means permits pivotal movement of said panel through a secured arc of from 0° to 35°.

4. The improvement of claim 2 wherein said hinge means includes interlocking means securing said first and second hinge members together at all positions through said secured arc.

5. The improvement of claim 3 wherein hinge means includes interlocking means securing said first and second hinge members together at all positions through said secured arc.

6. The improvement of claim 1 wherein said vent closure panel is a glass window.

7. The improvement structure of claim 1 wherein said hinge plate has a bend to provide a flat portion for attachment to said closure panel and an offset inclined portion bearing said slot means.

8. The improvement structure of claim 7 wherein said slot is spaced from said one edge of said hinge plate by a web having a width less than the width of the open portion of said dependent channel whereby said hinge plate can be attached to and detached from said arcuate tongue.

9. The improvement structure of claim 8 wherein said edge portion of said hinge plate has a diagonal width greater than the width of the open portion of said dependent channel so that said plate is interlocked to said tongue at selected angular orientations therein.

10. The improvement structure of claim 1 wherein said frame extends entirely about said opening with its opposite ends joined together in a butt joint secured by pin means carried in said dependent channel.

11. The improvement structure of claim 1 wherein the outboard side of said channel bears on outwardly dependent flange normal to said side to overlie supporting structure surrounding said opening.

12. The improvement structure of claim 11 wherein said structure includes a trim ring coextensive with said channel frame member and secured in assembly to the undersurface thereof by fastening means exerting a clamping force on said roof.

13. The improvement structure of claim 12 wherein said frame member bears a rib coextensive with the outboard side of its main channel to provide a receptacle slot for said fastening means.

14. The improvement structure of claim 13 wherein said receptacle slot also receives a bar member extending across said butt joint.

15. The improvement of claim 1 including an annular, resilient seal mounted in said main channel of said frame member.

16. The improvement of claim 1 including a second pair of side-by-side grooves extending transversely across said dependent channel on the side of said frame member opposite said first pair of grooves, and a mounting bracket received therein and pivotally supporting said latch means.

* * * * *